(12) United States Patent
Radl

(10) Patent No.: US 8,080,887 B2
(45) Date of Patent: Dec. 20, 2011

(54) CLOSED LOOP CONTROL OF HYDROGEN COOLING OF AN ELECTRIC POWER GENERATOR

(76) Inventor: Brad Radl, Chardon, OH (US)

(*) Notice: Subject to any disclaimer, the term of this patent is extended or adjusted under 35 U.S.C. 154(b) by 485 days.

(21) Appl. No.: 12/284,270

(22) Filed: Sep. 19, 2008

(65) Prior Publication Data

US 2010/0071889 A1 Mar. 25, 2010

(51) Int. Cl.
*F02B 63/04* (2006.01)

(52) U.S. Cl. .......................... 290/1 A; 322/20

(58) Field of Classification Search .............. 290/1 A, 290/2, 4 A, 4 R; 322/20; 310/55; 165/286
See application file for complete search history.

(56) References Cited

U.S. PATENT DOCUMENTS

| | | | |
|---|---|---|---|
| 5,581,470 A * | 12/1996 | Pawloski | 702/61 |
| 5,701,044 A * | 12/1997 | Emshoff et al. | 310/54 |
| 6,294,898 B2 * | 9/2001 | Lawson et al. | 322/20 |
| 6,456,095 B1 * | 9/2002 | Sorita et al. | 324/703 |
| 6,492,801 B1 * | 12/2002 | Sims et al. | 324/142 |
| 6,841,046 B2 * | 1/2005 | Puthawala et al. | 204/229.8 |
| 6,924,628 B2 * | 8/2005 | Thompson | 322/20 |
| 7,448,252 B2 * | 11/2008 | Brosnihan et al. | 73/31.03 |
| 7,474,080 B2 * | 1/2009 | Huff et al. | 322/24 |
| 7,550,113 B2 * | 6/2009 | Speranza et al. | 422/62 |
| 7,710,693 B2 * | 5/2010 | Guzman-Casillas et al. | 361/20 |

* cited by examiner

*Primary Examiner* — Michael Zarroli
(74) *Attorney, Agent, or Firm* — Clifford Kraft

(57) ABSTRACT

A closed loop control system for controlling generator cooling pressure, purity and dew point at power plants with hydrogen cooled generators to achieve optimum efficiency. The present invention uses feedback from plant status monitoring software to dynamically control parameters such as hydrogen pressure, purity and dew point to achieve optimum efficiency and provide necessary reserve capacity. The hydrogen pressure setpoint can be manipulated based on plant conditions such as output voltage, MVAR reserve capacity, likelihood of increased demand and other parameters. In general, an attempt is made to lower the pressure setpoint to achieve efficiency. Margin is built in to account for time lag in raising hydrogen pressure in the case of increased demand.

8 Claims, 5 Drawing Sheets

CLOSED LOOP CONTROL OF HYDROGEN COOLING OF AN ELECTRIC POWER GENERATOR

BACKGROUND

1. Field of the Invention

The present invention relates to the field of electric power generation and more particularly to cooling power plant generators with hydrogen using a closed loop control system.

2. Description of the Prior Art

Power plants take energy from coal, gas, nuclear or other fuels or from hydrostatic water to produce electricity for the electrical grid using electrical generators. These generators are large rotating electrical machines, and as such generate considerable heat do primarily to resistive electrical power losses as well as friction. Each of these generators must be cooled to remove this excess heat and hence keep the various parts of generator within a specified operating temperatures. A very common way of cooling the generators of a modern power generation plant is with hydrogen gas. Hydrogen gas is used because it is a very efficient coolant. The hydrogen supplied to cool a generator must have acceptable purity and water content (dew point). Typical pressure are maintained around 30 to 75 psig depending on age and size of the generator. As the generator operates, there is a continuous H2 gas leakage/usage resulting in pressure drop of the H2 pressure in the generator casing, A degradation in purity and dew point often occur over time as impurities and moisture are trapped in the system until a venting event, which generally is a manual release of casing gas. Generators have setpoints for maximum H2 pressure and alarms for low H2 pressure and low H2 purity, and possibly high dewpoint and high H2 gas outlet Temperature.

Since there is a small amount of continuous hydrogen leakage, when the hydrogen pressure begins to approach the lower allowable limit or alarm point, or on a regular time schedule (e.g. every day at 3:00 p.m., or broadly, such as the midnight shift), plant operators manually open a valve and repressurize the generator to its setpoint. If the purity is low or dew point is high, generator gas is vented and replaced with high quality hydrogen up to the pressure limit. This procedure is repeated until the desired purity or dew point is reached. Many systems may add a dryer specifically to maintain dewpoint as a single parameter.

Recently, equipment has been introduced that generates hydrogen on-site from water and other equipment that maintains the setpoints automatically. An example of this is HOGEN (Registered Trademark), and StableFlow (Registered Trademark) systems manufactured by Proton Energy Systems. The HOGEN® system is fed demineralized water and electricity and produces hydrogen gas using PEM technology, while the StableFlow® system automatically maintains a consistent setpoint for hydrogen pressure, hydrogen purity and hydrogen dew point. The control system automatically vents while generally adding 99.99% or better hydrogen gas simultaneously. In the United States most H2 is usually supplied by storage tanks and or cylinders and filled by truck deliveries, but comes a from a wide variety of sources. The actual source does not matter as long as the valving can supply gas to the generator in an automatic fashion.

The StableFlow® system samples hydrogen for purity and dew point and pressure from a hydrogn line, (e.g. H2 sample line) from the generator. For example, under the manual method, in a typical installation with setpoints of 60 psig hydrogen pressure, 99% purity and 20 degree F. dew point, the pressure might run from 57-60 psig, the purity from 97% to 99% and the dew point from 0 to 40 degrees F. Using StableFlow®, the pressure can be maintained at 60 psig ±0.2 psi; the purity can be maintained at 99%±0.2%, and the dew point can be maintained at 20 degree F.±2 degree F. all with no human intervention. StableFlow is a completely independent of the H2 gas source and only needs an open H2 regulator set to the desired P setpoint. The controls may tuned to differing tolerance levels and feedback timing, plus different configurations and quality of control equipment will affect the actual tolerance, but in all cases they permit the setpoints to be actively controlled, either singularly or together. Generally equipment like StableFlow® and HOGEN® are connected to the plant's distributed control system (DCS) so that monitoring can be handled remotely.

It is known in the art that a generator can operate over a range of temperatures and hence a range of hydrogen pressures. FIG. 3 shows a graph of this. For example, a unit with a maximum pressure rating of 60 psig and a temperature margin of 10 degrees F. at the hydrogen outlet gas could run as low as 50 psig while keeping the temperatures within manufacturers specifications. Of course, higher operating temperatures result in aging of organic materials in the generator core. Also, stator losses increase roughly 0.6% per degree F. (0.02% of the generator efficiency). However, it is also well known that there are considerable losses in the generator due to what is called windage. This is the fluid friction or gas resistance between the rotating generator parts and the hydrogen gas. These losses can be significantly reduced by running at lower hydrogen pressure. In the above example, if the generator were operated at only 50 psig, the windage loss is reduced by about 16%. For a 600 MW generator, that is around 480 KW of free power. Further, at lower hydrogen pressure, leakage is less, and hydrogen induced cracking is reduced. Also the work of the fans and pumps for the hydrogen and cooling water is reduced.

It is known in the art of alternating current machines that power is the combination of real power (Watts) which performs work and reactive power (VARs) which supports the magnetic fields required in the rotating devices in order for them to function. In an AC generator, an electric potential or output voltage is produced in the windings of a stator when an electrically unconnected rotor is rotated mechanically in the stator in a magnetic field. The magnetic field is produced and maintained by other windings (field windings) in the stator. Current flowing through the field windings in a perfect system would be purely reactive since it is used only to create a magnetic field. In a real generator, there are resistive losses in the field windings. Reactive power measured in VARs (volts times amps reactive) can be thought of as being supplied or used in a power system just as can real power or Watts that do actual work. VARs are generally thought of as being supplied onto the grid just as Watts are. A generator plant generally has a certain reserve capability to supply VARs into the system. Step up transformer reactive losses, reactive line losses of transmission lines and other losses can be thought of as using up VARs while the generator and hence the plant supplies VARs. As loads increase (the demand for electricity increases), VAR losses go up dramatically in the grid. For example, a 200 mile, 500 KV transmission line at a flow of 1200 MW requires around 400 MVARs (roughly the VAR output of 2 plants). However, if flow increased on that same line to 1500 MW because of increasing loads, the VAR losses go up to 900 MVAR. While the line is only supplying 300 MW more actual power it is "eating" 500 extra MVARs. Increased current on the line also leads to higher resistive line losses. In heavy line flows, the VAR losses can be 10 times greater than the resistive Watt losses. This all leads to decreasing end voltage. This results in reducing static VARs from capacitors by the square of the voltage and increased VAR losses at loads by the square of the current.

The dynamic generator reserves are related to its capability and are generally a function of the generator's cooling system. Generally higher hydrogen pressure leads to higher reserves. However, there are constraints: hydrogen pressure cannot be quickly increased. It may take about 30 minutes for a plant to move to higher pressure depending on pressure differential demanded, the pressure in the supply line, supply line width, casing volume, and other control and physical parameters of the specific configuration and equipment. Running continuously at higher pressure means higher costs for hydrogen losses and maintenance. There are various software programs available for power plants such as GenVARR™ developed by Southern Company, Inc. and the U.S. Department of Energy display present VAR and other status to plant operators on a real-time basis. This type of software can also show operators or controllers the status of multiple plants on a grid including their current VAR output and their reserve VAR capability.

It would be very desirable to be able to control generator pressure and other parameters such as purity and dew point dynamically based on capacity needed rather than maintaining the H2 pressure at or near the maximum allowed and other parameters addressed on a 'as needed' basis. The object could be to lower hydrogen pressure thus reducing windage losses and maintenance costs. Pressure can be increased when increasing loads on the plant demand more reserve VAR capacity. The state of VAR demand and voltage could be fed to a closed loop controller from dynamic monitoring software like GenVARR™.

SUMMARY OF THE INVENTION

The present invention relates to closed loop control of generator cooling pressure, purity and dew point at power plants using hydrogen cooled generators. By using lower hydrogen pressure, increased generator efficiency at a particular load can be achieved due to decreased windage even though temperature of the cooling gas and generator may tend to increase if the generator previous had high H2 purity. Because decreased purity results in increased windage loss which results in more heat that has to be removed by the hydrogen, keeping the purity high offsets the increase in temperature caused by lower pressure. The present invention uses feedback from plant status monitoring software or remote monitoring systems or integrated package of sensors and control elements to dynamically control parameters such as hydrogen pressure, purity and dew point to achieve optimum efficiency and provide necessary reserve capacity. The hydrogen pressure setpoint can be manipulated based on plant conditions such as output voltage, MVAR reserve capacity, likelihood of increased demand and other parameters. In general, an attempt is to determine an optimum H2 pressure setpoint, below the maximum H2 pressure limit, resulting in improved generator efficiency. The present invention allows the total cost of production, including equipment health, power costs, and other parameters to be factored into determining operational setpoints. Margin can be built in to account for time lag in raising hydrogen pressure in the case of increased demand.

DESCRIPTION OF THE FIGURES

Attention is now directed at several illustrations to aid in understanding the present invention.

Several drawings and illustrations have been presented showing various features of the present invention. The scope of the present invention is not limited to what is shown in the figures.

DESCRIPTION OF THE INVENTION

The present invention is related to a closed loop control system for hydrogen cooling of a generator in an electric power generation plant. As was previously discussed, modern systems maintain hydrogen pressure, purity and dew point very close to fixed setpoints, either through use of active control like StableFlow or through manual adjustments for adding and venting H2 gas and generator casing gas respectively. The pressure set point is usually the high pressure limit for the generator. This practice can result in higher costs and lost generator efficiency, since leakage and windage losses increase with pressure and often leads to lower purity than optimal and higher dewpoints than optimal.

The present invention manipulates the setpoints of the hydrogen control system according to feedback from plant monitoring software or other sources of information, including dispatch (e.g. MW demand, MW pricing). Knowing the state of the required load and the plant's output VARs or other parameters related to load, load demand, current and past physical operating parameters and characterictic curves for the generator allows the present invention to determine an optimum hydrogen pressure for current environmental, equipment and power demand situations and act upon it. This results in a cost savings for the plant and potentially more power output and the ability to optimize H2 pressure with other parameters, including but not limited to generator life and H2 usage costs. Dynamically determining the interaction between H2 pressure, purity and dewpoint allows further control strategy improvements.

As described, lowering the hydrogen pressure at the generator generally causes the temperature of the cooling gas and generator to rise. However, this is offset by the decrease in losses due to windage. If the purity is maintained at a higher level there is an additional reduction in windage loss. All windage loss reduction is less heat to be removed from the system and therefore the temperature rise can be constrained or even reversed. Thus, lowering the pressure using pure hydrogen can result in no or very little net increase in temperature at a particular load. Since it is not possible to instantly increase the pressure if demand for capacity increases (it might take 30 minutes to increase the pressure by 5 psi), a safety margin would usually be built in.

Figure 1:
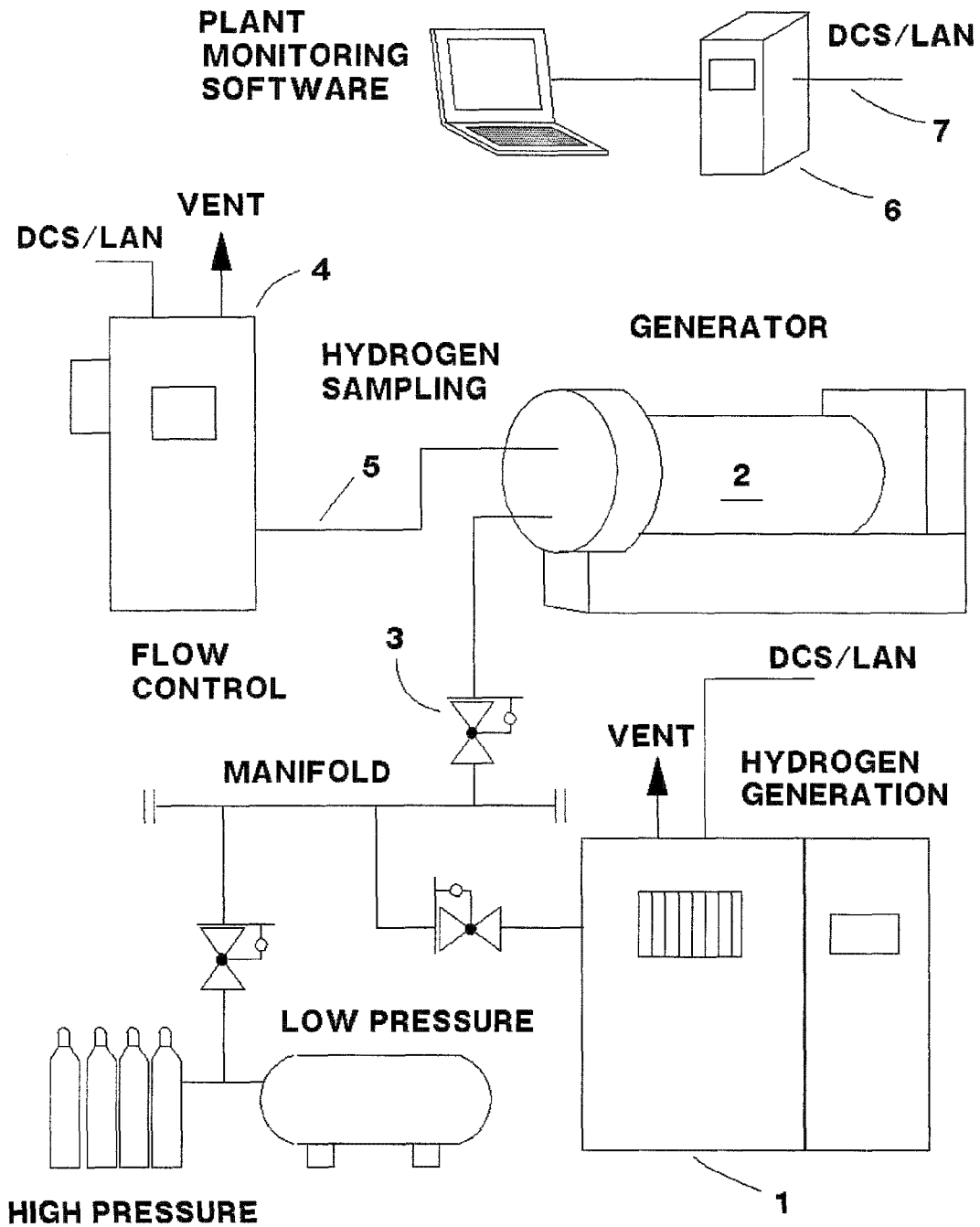
FIG. 1 shows a plant diagram of the hydrogen cooling system as is currently used.

FIG. 1 shows a prior art system. A hydrogen generation system 1 supplies pure hydrogen to a system of storage tanks or directly from a generator 2. The hydrogen is supplied by on-site or off-site generator and or hydrogen can also be supplied by truck or rail or equivalent from outside sources. A valve 3 supplies hydrogen to the generator for cooling. A hydrogen monitoring system 4 monitors hydrogen in the generator by a sampling line 5. When pressure drops below a low pressure alarm point, more hydrogen is added to the system to increase pressure. When purity or dew point drops or rises to alarm points, hydrogen is added and removed from the generator in a controlled venting/H2 gas introduction process. Plant monitoring software 6 independently monitors plant capacity and grid demand. All of these systems can be connected and communicate with each other on a local area network (LAN) or DSC system 7.

Figure 2:
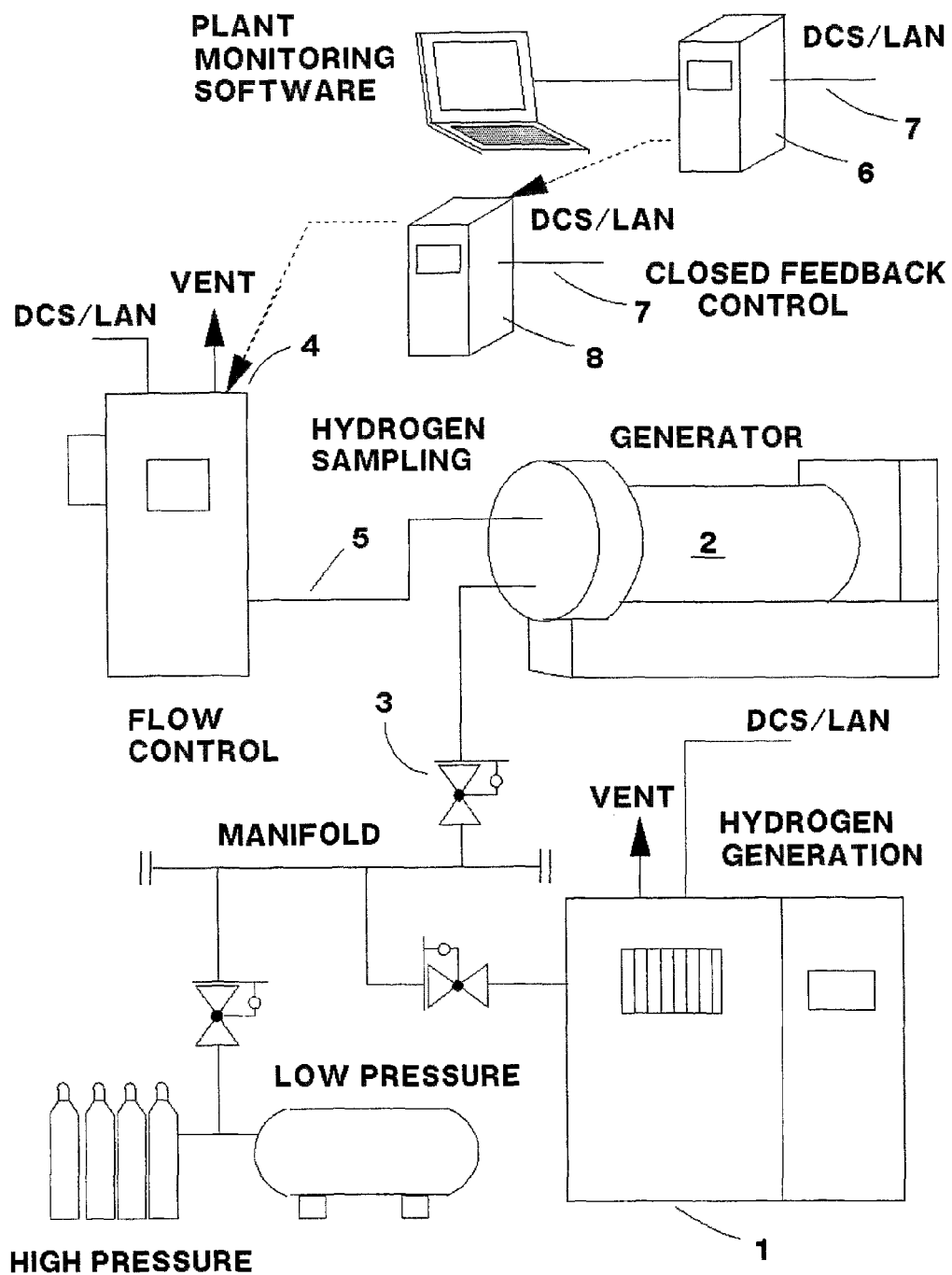
FIG. 2 shows a plant diagram of the closed-loop system of the present invention.

FIG. 2 shows an embodiment of the present invention. The system is similar to the prior art system of FIG. 1 except that data from the plant monitoring software (whether at the power plant or outside, e.g. the DCS at the power plant, or dispatch at the central offices) 6 is supplied into the hydrogen control system 4. Additional software can either in the hydrogen control system controller or in an external computer 8 can change the setpoints for pressure, purity and dew point. In the simplest embodiment, only the pressure setpoint is changed. Parameters from the plant monitoring software 6 that can be used are megawatts, output voltage, MVAR output, MVAR reserve and MVAR capacity, MW rate of change, MVAR rate of change, and cost of electricity, H2 outlet temperature, H2 inlet temperature, (H2) water cooler inlet or outlet temperature, (H2) oil cooler inlet or outlet temperature, stator winding temperature, core temperature, other generator temperature measurements, cost of fuel (coal, oil, natural gas, nuclear, etc.), sale price of power (e.g. wholesale or retail), aging cost curve, other aging costing functions for generators and support equipment, power of auxiliary pumps and fans (including voltage or amp), cooling fluid flow (H2 gas, cooler water, cooling oil, other cooling medium for the H2 gas), cost of H2 gas, ambient temperature, ambient humidity, generator efficiency, unit heat rate (gross, net, etc.), valve positions on H2 lines, main steam flow, main steam valve position, main steam calculated energy flow, and other physical parameters indicative of generator condition (including but not limited to, vibration, power factor), and costs of operation, whether directly measured, calculated, inferred, estimated or input as constants. All data may be validated, averaged, or otherwise processed to before usage. The likelihood of the load increasing may be estimated or may be fed in from other plant software or remote sites (e.g. from a dispatch center). Parts of the system including the control system of the present invention can communicate with each other over a LAN or DSC 7 or other means of communication. Direct manipulation of setpoints in the hydrogen control system 4 may also be made by a standard current loop known in the art.

The most basic approach is to simply turn down the hydrogen pressure setpoint when MVAR reserve capacity is high and the likelihood of increasing load is small. A margin must be built in since there is a significant time lag in increasing the pressure. For example, a unit with a maximum pressure rating of 60 psig and a temperature margin of 10 degree F. could be run at a pressure of 57 psig. In the manual method before the existence of the hydrogen control system, the low pressure alarm point was typically this low. Even though there is a tendency for the generator to run at higher temperature at this lower pressure, this can be offset and practically neutralized by maintaining the hydrogen purity very high or in any case able to optimize the hydrogen purity based on any monitoring or calculated parameters, (e.g. simple case: use calculated leak rate, cost of H2 and estimate/calculated usage to achieve each purity level balanced against cost of windage loss)

An alternate approach is to match the hydrogen pressure to the hydrogen outlet temperature or other gating parameter on heat removal from the generator. In an example of this embodiment, the controller would maintain a curve relating hydrogen exit temperature, MWs and hydrogen pressure. Other parameters can also be used such as purity, cost of power and the like. The present invention then adjusts the pressure setpoint to achieve the desired cooling. For example, if the maximum end temperature for the exit gas was 40 deg. C., the unit would have a curve that either set the pressure for the lowest level and the highest power, or set the pressure for the average power currently to be generated or demanded. A safety margin could be built in to account for the lag time in raising pressure versus allowable load increase or decrease.

Figure 3:
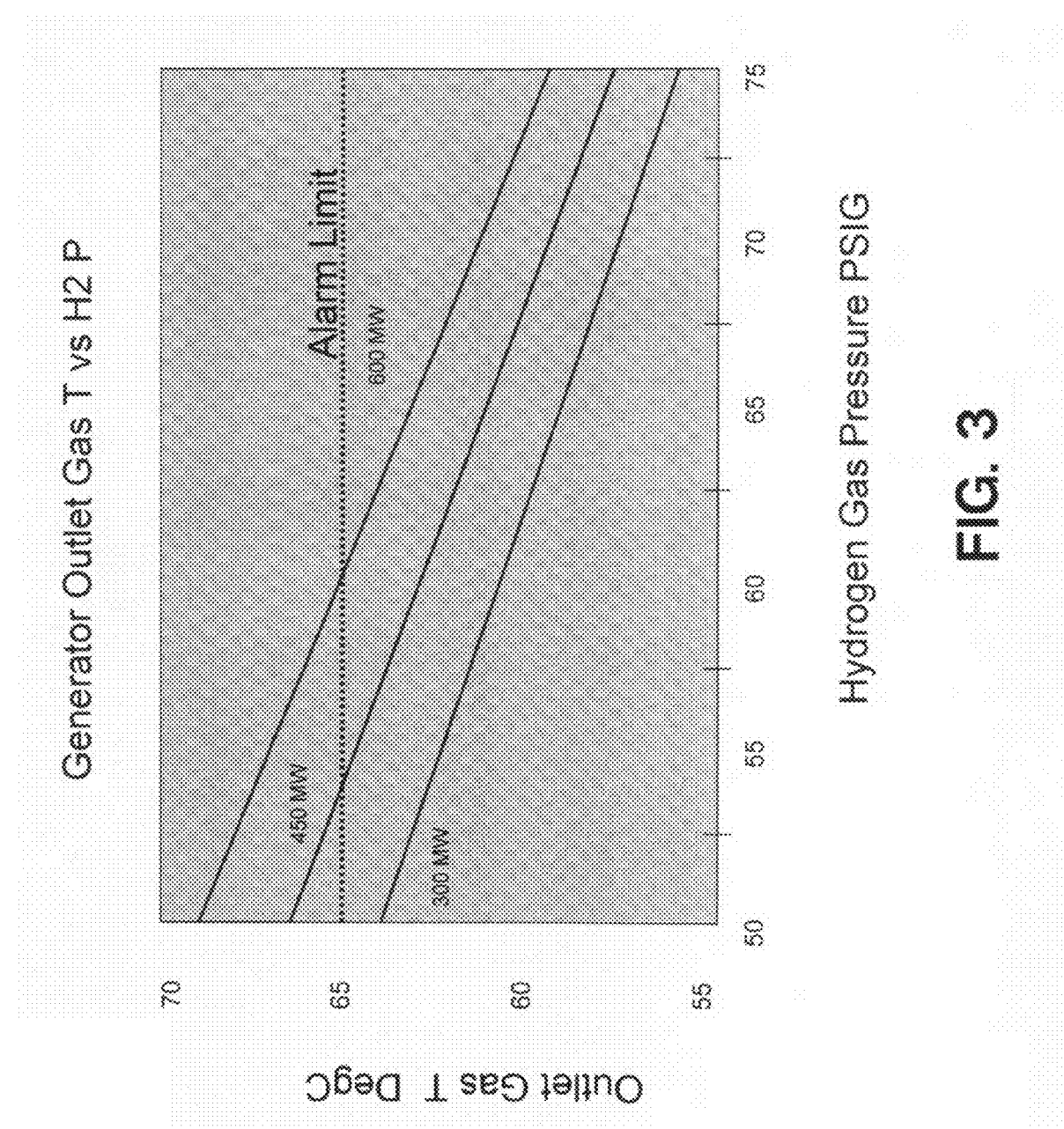
FIG. 3 shows a graph of generator outlet gas temperature vs. hydrogen pressure.

FIG. 3 shows a graph of outlet gas temperature vs. hydrogen pressure for a typical 600 MW generator with curves shown for 300 MW, 450 MW and 600 MW outputs. An alarm limit is shown at 65 degrees C. It can be seen from this graph that as gas pressure is lowered, temperature rises. It can also be seen that at a constant pressure, when generator output goes up because of increasing demand for power, temperature also rises. In the dynamic system of the present invention, if an H2 setpoint has been chosen below maximum pressure, this setpoint may have to be raised in response to increasing demand.

Figure 4:
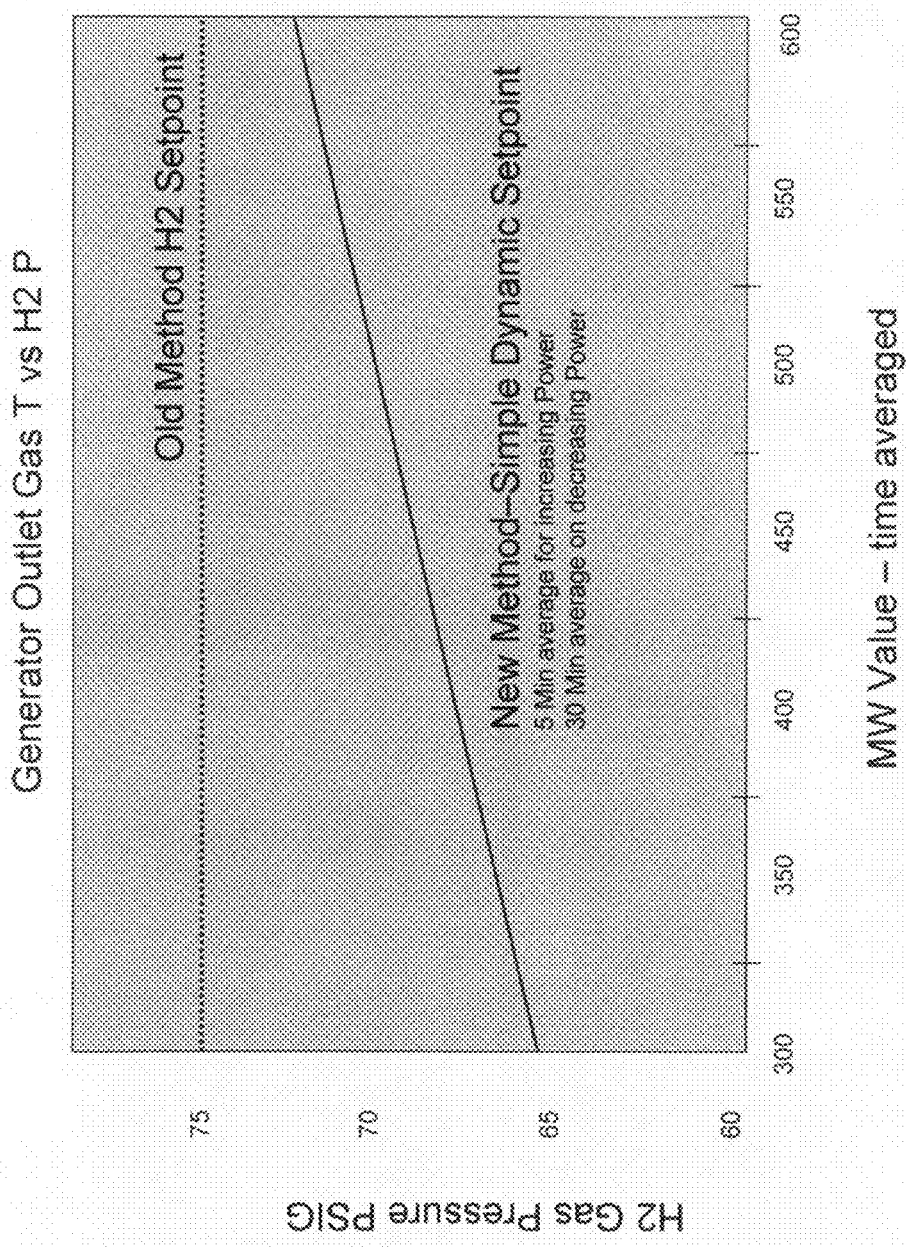
FIG. 4 shows sample control curves.

FIG. 4 shows a sample control curve based on sampling or reading the power plant parameter of megawatts (MW). This value can come directly from the generator, or it can be communicated from a central control or remote location. As the time average demand in MW increases in the new method of the invention, the H2 gas pressure setpoint is increased. An example control algorithm based on 5 minute sampling could be as follows starting with an MW sample:

1. Is any outlet gas temperature above or equal to the safety curve?
   If no proceed to the next step; otherwise, bias the main control curve by the amount above the expected value and set an alarm condition. If the biased curve creates a pressure that exceeds maximum pressure for the generator, set pressure to maximum and set an alarm condition.
2. Read the MW signal either from the actual generator or from dispatch. If power is increasing, adjust the H2 pressure to the current control curve and disable the purity and dewpoint enhancement flags. If power is decreasing, lag the adjustment by 2 cycles of the average signal, enable the purity and dewpoint enhancement flags. For steady power, enable the purity and dewpoint enhancement flags.
3. Allow regular control logic to control H2 pressure until next sample of MW.
4. Upon MW sample, go to step 1.

For example, using the 600 MW generator of FIG. 3, at an output of full 600 MW with an H2 gas pressure of 75 psig, the outlet gas temperature should be below 60 degrees C. In step 1 of the algorithm, if the temperature is below 60 degrees C., proceed to step 2. If the temperature were 62 degrees C., then the control curve of FIG. 4 would have a positive bias to it of around 3 psig. The bias added to the curve can be taken out when the temperature decreases to or below normal values. This example has been given to illustrate a feature of the present invention. The scope of the present invention is not limited to the cases given in any examples. It is fully expected that values derived from the adjustments, for example the changing curve relating outlet temperature to MW loading, or H2 pressure and purity, can be used as diagnostics on generator or instrumentation health.

As has been discussed, the present invention dynamically controls the H2 pressure setpoint in closed loop fashion above a system that regulates H2 pressure based on that setpoint. A new hard setpoint that could be called a "low alarm limit" can also be added for safety. The dynamic setpoint will never be allowed to go below the low alarm limit. This puts an absolute base on how low the dynamic system can set the hydrogen pressure to the generator. It is also within the scope of the present invention to use a second hard setpoint that could be called "high alarm limit". This value can be based on the manufacturer casing safety limit for high pressure. The dynamic H2 setpoint will not ever be allowed to increase beyond the high alarm limit. In addition to H2 setpoints, the present invention can also use setpoints for purity and dewpoint. These setpoints can also have boundary or minimum and maximum allowed values or alarm limits. While purity could can be allowed to approach the theoretical maximum of 100%, attempts to reach too high a purity might lead to excessive venting of casing gas.

If the purity setpoint is also being controlled dynamically, a balance between pressure and purity must be established. For example, if pressure is being lowered, the system should not be also adding gas to increase purity. A possible algorithm for controlling the purity setpoint could be based on time and MW. For know peak load times (say 7:00 AM to 5:00 PM), the algorithm can start with maximum purity, but allow degradation during full load operation up until the windage loss penalty exceeds the cost of venting gas or more pressure loss is called for.

If the dewpoint setpoint is being dynamically controlled, a possible algorithm could also be based on time and MW. Again during the peak loading times, the algorithm could start with the lowest dewpoint and allow degradation during full load operation up until it approached its high alarm limit. At that point, the dewpoint setpoint could be held constant. Generally, it is desired to perform venting of casing gas when purity is low or dewpoint is high or when the unit load is stable or dropping.

Several control techniques have been described. More complex methods can include also using hydrogen purity and dew point setpoints by performing complete optimization. Factors such as power produced, hydrogen usage, cost of hydrogen production, life cycle of the generator can also be optimized. All of these techniques are within the scope of the present invention.

Figure 5:
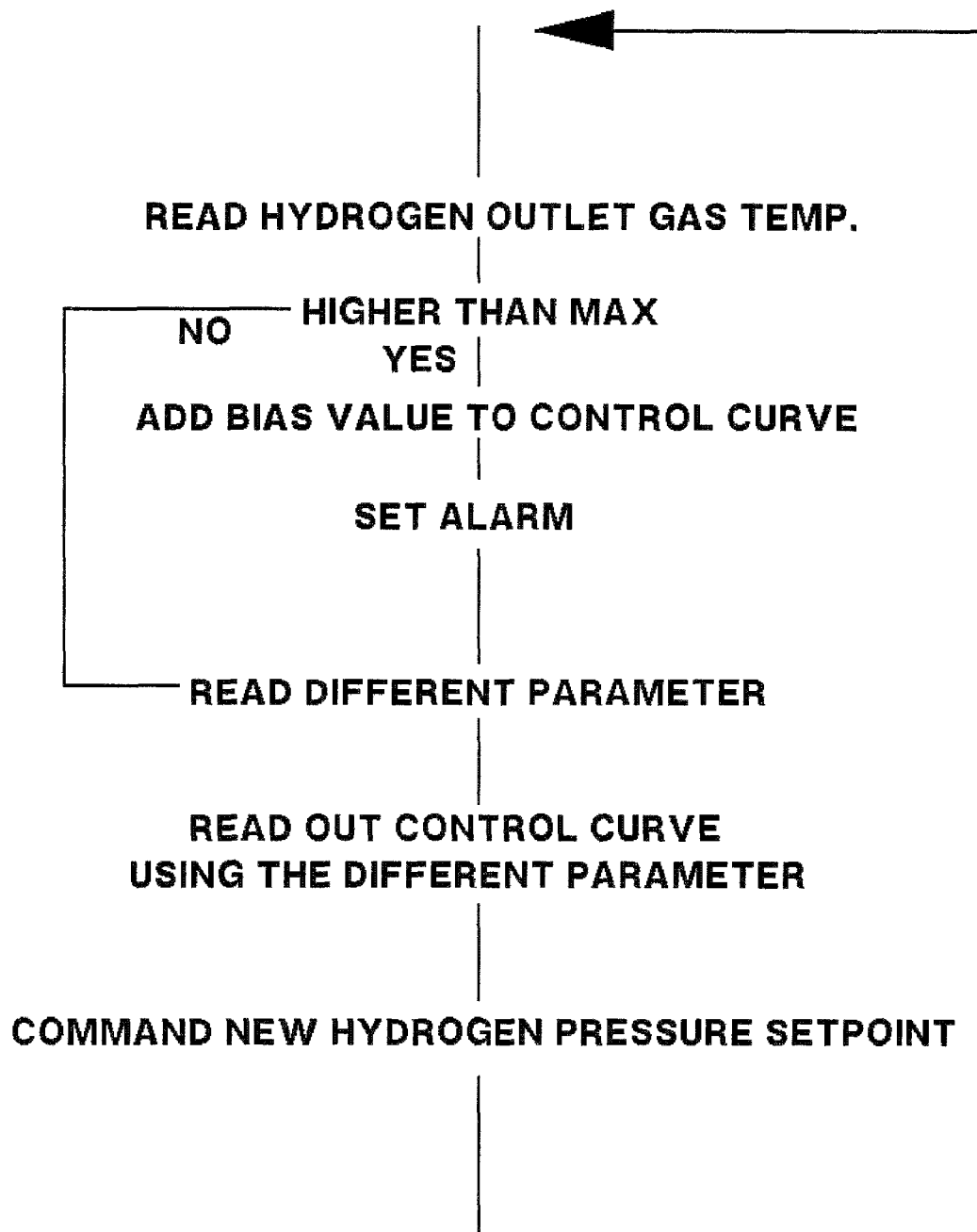
FIG. 5 shows control steps used by an embodiment of the present invention.

FIG. 5 shows a series of control steps used by a particular embodiment of the invention.

Several descriptions and illustrations have been provided to aid in understanding the present invention and its features. One with skill in the art will realize that numerous changes and variations can be made without departing from the spirit of the invention. Each of these changes and variations is within the scope of the present invention.

I claim:

1. A method for controlling a hydrogen cooled generator comprising:
reading hydrogen outlet gas temperature, and if said hydrogen outlet gas temperature is equal to or above a maximum value, adding a bias value to a mathematical control function and setting an alarm;
reading a first power plant parameter other than hydrogen pressure;
using said mathematical control function by entering said first power plant parameter and determining a hydrogen pressure setpoint;
commanding said hydrogen pressure setpoint if different from a current hydrogen pressure setpoint;
wherein said power plant parameter is megawatts; and
further comprising lagging said commanding if power is decreasing.

2. The method of claim 1 wherein said power plant parameter is MVAR-reserve capacity.

3. The method of claim 1 wherein said power plant parameter is output voltage.

4. The method of claim 1 further comprising reading a second power plant parameter.

5. The method of claim 4 wherein said first and second power plant parameters are entered into a to determine said hydrogen pressure setpoint.

6. The method of claim 4 wherein said first power plant parameter is chosen from the group consisting of megawatts, output voltage, MVAR-output, MVAR-reserve capacity, MVAR-residual and cost of electricity.

7. The method of claim 1 wherein said second power plant parameter is either purity or dewpoint.

8. A control process for controlling a hydrogen cooled generator at a power plant to run at reduced hydrogen pressure for efficiency comprising:
(1) reading MW-out;
(2) measuring outlet hydrogen gas temperature;
(3) determining if outlet hydrogen gas temperature is above a particular point on a specified safety curve;
(4) going to step (6) if yes;
(5) biasing a main control loop by an amount equal to a difference between said outlet hydrogen gas temperature and the particular point on said specified safety curve;
(6) determining if MW-out increasing, decreasing or remaining unchanged;
(7) adjusting a hydrogen pressure setpoint and disabling hydrogen purity and dewpoint flags if MW-out is increasing;
(8) lagging adjustment of said hydrogen pressure setpoint by a predetermined number of cycles and enabling hydrogen purity and dewpoint flags if MW-out is decreasing or remaining unchanged;
(9) allowing normal control of hydrogen pressure until a next MW-out sample;
(10) reading MW-out;
(11) going to step (2).

* * * * *